(12) United States Patent
Liobe et al.

(10) Patent No.: US 10,397,504 B2
(45) Date of Patent: Aug. 27, 2019

(54) CORRECTING LAG IN IMAGING DEVICES

(71) Applicant: Sensors Unlimited, Inc., Princeton, NJ (US)

(72) Inventors: John Liobe, New York, NY (US); Joshua Lund, Dallas, TX (US)

(73) Assignees: Kidde Technologies, Inc., Wilson, NC (US); Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 15/431,179

(22) Filed: Feb. 13, 2017

(65) Prior Publication Data

US 2018/0234648 A1 Aug. 16, 2018

(51) Int. Cl.
*H04N 5/359* (2011.01)
*H04N 5/217* (2011.01)

(52) U.S. Cl.
CPC ........... *H04N 5/3597* (2013.01); *H04N 5/217* (2013.01)

(58) Field of Classification Search
CPC ........ H04N 5/2256; H04N 9/735; H04N 5/33; H04N 5/225
USPC ......................... 348/208.1, 630–631; 345/1.1
See application file for complete search history.

(56) References Cited

U.S. PATENT DOCUMENTS

| | | | |
|---|---|---|---|
| 7,609,303 B1 | 10/2009 | Lee et al. | |
| 8,872,946 B2 | 10/2014 | Cote et al. | |
| 9,232,119 B2 | 1/2016 | Nash et al. | |
| 9,451,183 B2 | 9/2016 | Hogasten et al. | |
| 2002/0191104 A1* | 12/2002 | Matsutani | H04N 9/646 348/441 |
| 2007/0035706 A1* | 2/2007 | Margulis | G03B 21/20 353/122 |
| 2007/0252779 A1* | 11/2007 | Nishiyama | A63F 13/10 345/1.1 |
| 2009/0200466 A1 | 8/2009 | Mammen et al. | |
| 2010/0302397 A1* | 12/2010 | Huang | H04N 5/144 348/222.1 |
| 2012/0074321 A1* | 3/2012 | Hunter | G02B 26/02 250/332 |
| 2012/0138774 A1 | 6/2012 | Kelly et al. | |
| 2013/0083246 A1* | 4/2013 | Chen | G06T 5/002 348/620 |
| 2013/0314557 A1* | 11/2013 | Furukawa | H04N 5/225 348/208.1 |
| 2014/0247365 A1 | 9/2014 | Gardner et al. | |
| 2014/0340515 A1* | 11/2014 | Tanaka | G06T 5/003 348/143 |
| 2015/0334315 A1* | 11/2015 | Teich | H04N 5/2257 348/164 |
| 2016/0248953 A1* | 8/2016 | Fujita | H04N 5/2256 |

* cited by examiner

*Primary Examiner* — Xi Wang
(74) *Attorney, Agent, or Firm* — Locke Lord LLP; Scott D. Wofsy; Judy R. Naamat

(57) ABSTRACT

A method of correcting lag in an imaging pixel includes receiving a current frame pixel value and determining a current filter coefficient using the current frame pixel value. A pixel output is determined from a product of the current frame pixel value and current frame filter coefficient. The product of a first prior frame pixel value and corresponding first prior frame filter coefficient is added to the pixel output to generate a corrected pixel output to more closely indicates incident illumination on the imaging pixel during an integration period from which the current frame pixel value was obtained.

20 Claims, 4 Drawing Sheets

CORRECTING LAG IN IMAGING DEVICES

BACKGROUND OF THE INVENTION

1. Field of the Invention

The present disclosure relates to imaging, and more particularly to lag correction in image data generated by imaging devices.

2. Description of Related Art

Imaging devices commonly employ a sensor to acquire image data from light incident on the sensor. The sensor typically converts light incident on the sensor into a photocurrent and integrates that photocurrent over an exposure period to generate a signal, which is then communicated to a digital readout circuit. Image lag or persistence is a phenomenon demonstrated by some imaging pixel readout circuits wherein the signal voltage integrated for one exposure period contains a residual voltage imparted from signal in a previous exposure period.

Image lag or persistence can result under several different circumstances. For example, an incomplete reset of the pixel or integration node prior to the subsequent integration period can cause imaging lag or persistence. Imaging lag or persistence can also result from bandwidth constraints in the signal path from the pixel, such as between the pixel and the readout circuit or between the readout circuit and downstream devices. Lag behavior of a pixel readout circuit may be measured or modelled, but digital correction has historically been prohibitive at the digital readout circuit due to the physical constraints of the silicon area of the readout circuit.

Such conventional methods and systems have generally been considered satisfactory for their intended purpose. However, there is still a need in the art for improved imaging systems and methods. The present disclosure provides a solution for this need.

SUMMARY OF THE INVENTION

A method of correcting lag in an imaging pixel includes receiving a current frame pixel value and determining a current filter coefficient using the current frame pixel value. A pixel output is determined from a product of the current frame pixel value and current frame filter coefficient. The product of a first prior frame pixel value and corresponding first prior frame filter coefficient is added to the pixel output to generate a corrected pixel output that more closely indicates incident illumination on the imaging pixel during an integration period from which the current frame pixel value was obtained.

In certain embodiments, the method can include receiving the current frame pixel value, the first prior frame pixel value and at least one second prior frame pixel value. A filter coefficient can be determined for the second prior frame pixel value. The second prior frame pixel value and the filter coefficient corresponding to the second prior frame pixel value can be multiplied together. The product to the second prior frame pixel value and the corresponding filter coefficient can be to the output value to further correct the pixel output.

In accordance with certain embodiments, the method can include buffering the pixel value, such as in a last-in-first-out circular buffer. The method can include buffering first prior frame pixel value. The method can include buffering the one or more second prior frame pixel values. Buffering can be done locally, in a buffer defined with a silicon architecture of a readout interface circuit (ROIC) communicative with the imaging pixel. Buffering the current frame pixel value can include designating the most recent pixel value in the buffer the first prior frame pixel value. Buffering can include re-designating the first prior frame pixel value as a second prior frame pixel value. A prior frame pixel value, e.g., a second prior frame pixel value, can be removed from the buffer.

It is also contemplated that, in accordance with certain embodiments, determining the filter coefficient can include looking up the filter coefficient in a lookup table using the pixel value. The lookup table can be a global lookup table. The lookup table can be a global lookup table. Determining filter coefficient for the first prior frame pixel value can include looking up a filter coefficient for the first prior frame pixel value in the lookup table using the first prior frame pixel value. Determining filter coefficient for the second prior frame pixel value can include looking up a filter coefficient for the second prior frame pixel value in the lookup table using the second prior frame pixel value.

A method of correcting lag in an imaging device includes buffering a pixel values from two or more frames on a ROIC, retrieving filter coefficients for the pixel values from two or more frames from a lookup table stored on the ROIC, and calculating pixel output for a current frame by summing products of the two or more frames and filter coefficients for the frames using a processor disposed on the ROIC.

An imaging apparatus includes a sensor a ROIC. The sensor has an array of imaging pixels. The ROIC has a processor and a buffer and is disposed in communication with the sensor and a memory. The memory has instruction recorded on it that, when ready by the processor, cause the processor to receive a pixel value from the sensor, determine a filter coefficient for correcting the pixel value, and calculating a pixel output by multiplying the pixel value by the filter coefficient. One or more prior frame pixel values are multiplied by a prior frame pixel value filter coefficient and added to the pixel output to make the pixel output more closely correspond to illumination incident upon the imaging pixel during the integration period during which the pixel value was acquired.

In certain embodiments, memory can be co-located with the ROIC. The memory can be remote from the ROIC. A look-up table with filter coefficient can be recorded on the memory. The look-up table filter coefficients can include modelled pixel data derived from a controlled illumination setup with pixel measurements acquiring at one or more step function transitions between changes in intensity of illumination incident upon the sensor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
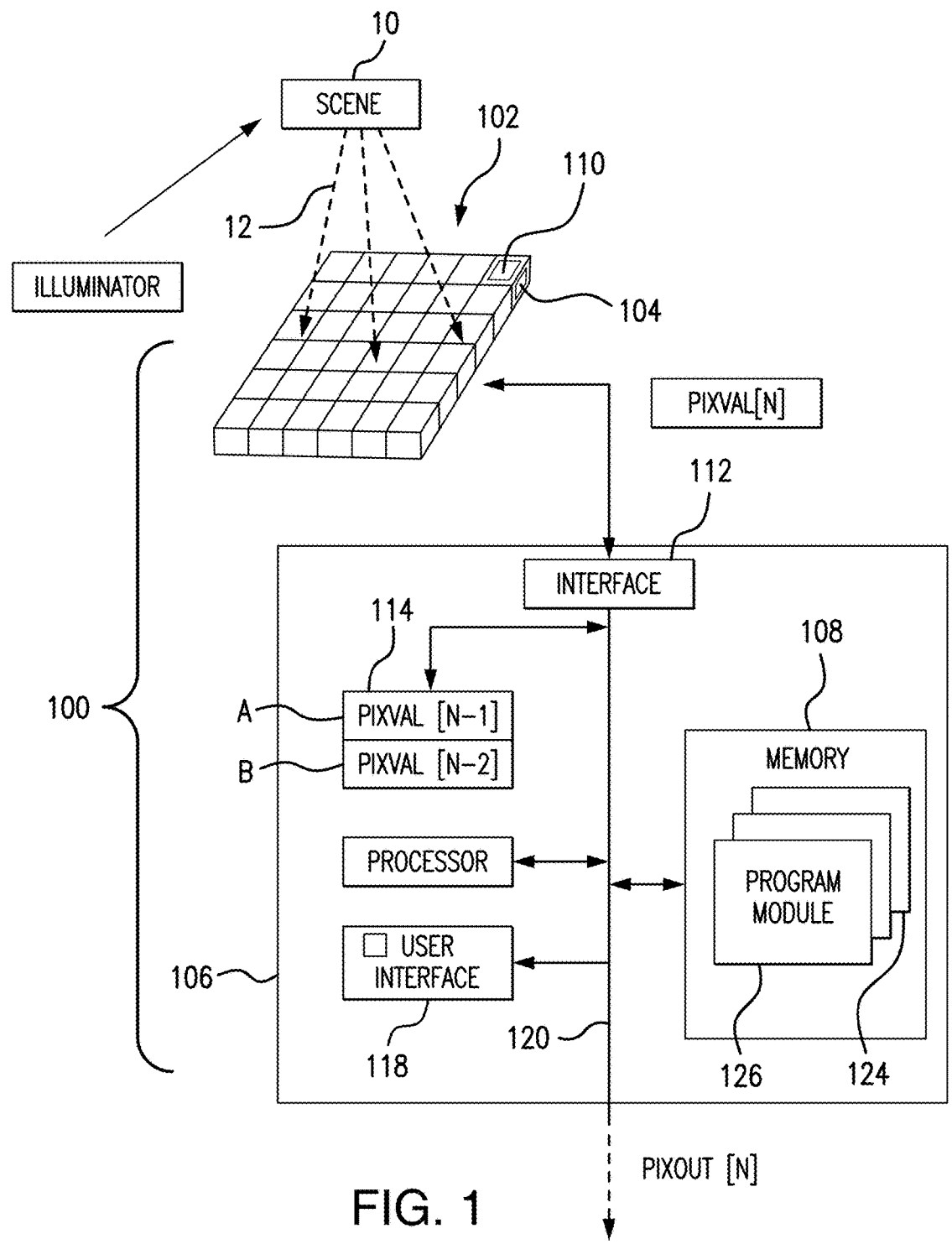
FIG. 1 is a schematic view of an exemplary embodiment of an imaging apparatus constructed in accordance with the present disclosure, showing readout interface circuit (ROIC) with a buffer and a processor disposed in communication with a memory and a sensor.

Reference will now be made to the drawings wherein like reference numerals identify similar structural features or aspects of the subject disclosure. For purposes of explanation and illustration, and not limitation, a partial view of an exemplary embodiment of an imaging device constructed in accordance with the disclosure is shown in FIG. 1 and is designated generally by reference character 100. Other embodiments of imaging devices and method in accordance with the disclosure, or aspects thereof, are provided in FIGS. 2-4, as will be described. The systems and methods described herein can be used to correct image data for detector lag or persistence in infrared imaging devices, though the present disclosure is not limited to infrared imaging devices or to the correction of detector lag or persistence in general.

Referring to FIG. 1, an imaging apparatus 100 is shown. Imaging apparatus 100 includes a sensor 102 having a plurality of imaging pixels 104 and a readout integrated circuit (ROIC). Sensor 102 is arranged to receive from a scene 10 incident illumination 12, and converts incident illumination into discrete electrical charges in respective imaging pixels 104. The conversion takes place within an integration period of predetermined duration, after which ROIC 106 reads the accumulated charge as an intensity value during a succeeding read period. Although the following discussion is in context of a single imaging pixel it is to be understood and appreciated that a matrix of imaging pixels arranged in rows and columns sequentially acquires charge data in spatial correspondence with scene 10 during integration periods, which ROIC 106 readouts in the succeeding read period, read periods following integration periods during imaging.

Imaging pixel 104 includes a photodiode 110 which are arranged to convert electromagnetic radiation into electrical charge according a predetermined waveband. In certain embodiments, photodiode 110 is arranged to convert electromagnetic radiation in an infrared waveband into a pixel value (pixval) during an integration period (N), e.g., pixval [N]. In accordance with certain embodiments photodiode is arranged to convert electromagnetic radiation from incident illumination 12 within a shortwave-infrared (SWIR) or a near-infrared (NIR) waveband into a succession of pixel values during successive integration periods, ROIC 106 reading each pixel value during intervening read periods. It is contemplated that sensor 102 can include an array of imaging pixels 104 with photodiode 110 having indium-gallium-arsenide (InGAS) silicon-based photodiodes, such as available from Sensors Unlimited Inc. of Princeton, N.J.

As will be appreciated by those of skill in the art, some imaging sensors can exhibit a phenomenon known as image lag or persistence (lag). Lag occurs when an imaging pixel fails to fully reset during the read interval following an integration period, such as by retaining a portion of the charge acquired during a preceding integration interval. The retained charge from the prior integration interval causes the charge acquired in the succeeding integration interval to be higher than otherwise should be indicated by the charge at the end of the succeeding integration period given the incident illumination witnessed by the imaging pixel. This can be due to an incomplete reset of the integration node or due to an inherently low bandwidth signal path. As will also be appreciated, lag can reduce the correspondence of image data generated by the imaging pixel to that provided in illumination received from the scene.

Without being bound by a particular theory, Applicants understand lag to be an artifact of the architecture of the sensor photodiodes which is influenced by the history of intensity changes between prior integration periods. Historically, digital corrections to imaging pixel output on a ROIC have been prohibitive due to the silicon area required for the associated circuitry. However, by employing three-dimensional integrated circuit architecture to implement digital circuitry mated with analog imaging pixel on-ROIC digital processing for lay correction is possible. Accordingly, ROIC 106 is arranged to correct lag through use of a temporal sharpening filter to systematically remove image lag in real time. In the illustrated exemplary embodiment, ROIC 106 does this without employment of frame buffering, DRAM, or signal processing resources external of ROIC 106. Advantageously, this can extend the use of lower bandwidth imaging pixel architectures, which can provide further collateral benefits such as very low read noise.

With continuing reference to FIG. 1, ROIC 106 has an interface 112, a buffer 114, and a processor 116. ROIC 106 also has a memory 108 and a user interface 118. Interface 112 connects ROIC 106 with sensor 102 and can include a chip stack arrangement, for example, from interfacing analog sensor 102 with digital circuitry of ROIC 106. Buffer 114, processor 116, and processor 116 are each communicative with one another and sensor 102 through a digital bus 120.

User interface 118 is optional, and can include a display for displaying an image of scene 10, diagnostic information, or to receive input from a user. Processor 116 includes digital signal processing hardware that can perform selected digital signal processing operation, e.g., addition, subtraction, multiplication, division, shifting, etc.

Buffer 114 includes digital storage for pixel values for at least two integration periods for pixel values for imaging pixels 104, e.g., pixel values A and B, for imaging pixel 104. Buffer 114 can be physically implemented within the architecture of memory 108.

Memory 108 includes a non-transitory machine readable medium having recorded of on the medium a lookup table 124 and a plurality of program modules 126. Lookup table 124 is a global lookup table, i.e. not associated any particular imaging pixel, for applying filter coefficients to pixel values received from sensor 102. It is contemplated that lookup table 124 include filter parameters generated from modelled pixel values derived from a controlled illumination setup where characteristic pixel responses are recorded for exemplary step function transitions in incident illumination during successive integration periods. Program modules 126 have instructions recorded thereon that, when read by processor 116, cause processor 116 to execute certain operations, e.g., method 300, as will be described.

It is contemplated that ROIC 106 allow for correcting lag in imaging device 100 by buffering pixel values from two or more frames on ROIC 106, retrieving filter coefficients for the pixel values from two or more frames from a lookup table stored on ROIC 106, and calculating pixel output for a current frame by summing products of the two or more frames and filter coefficients for the frames using a processor disposed on ROIC 106.

Figure 2:
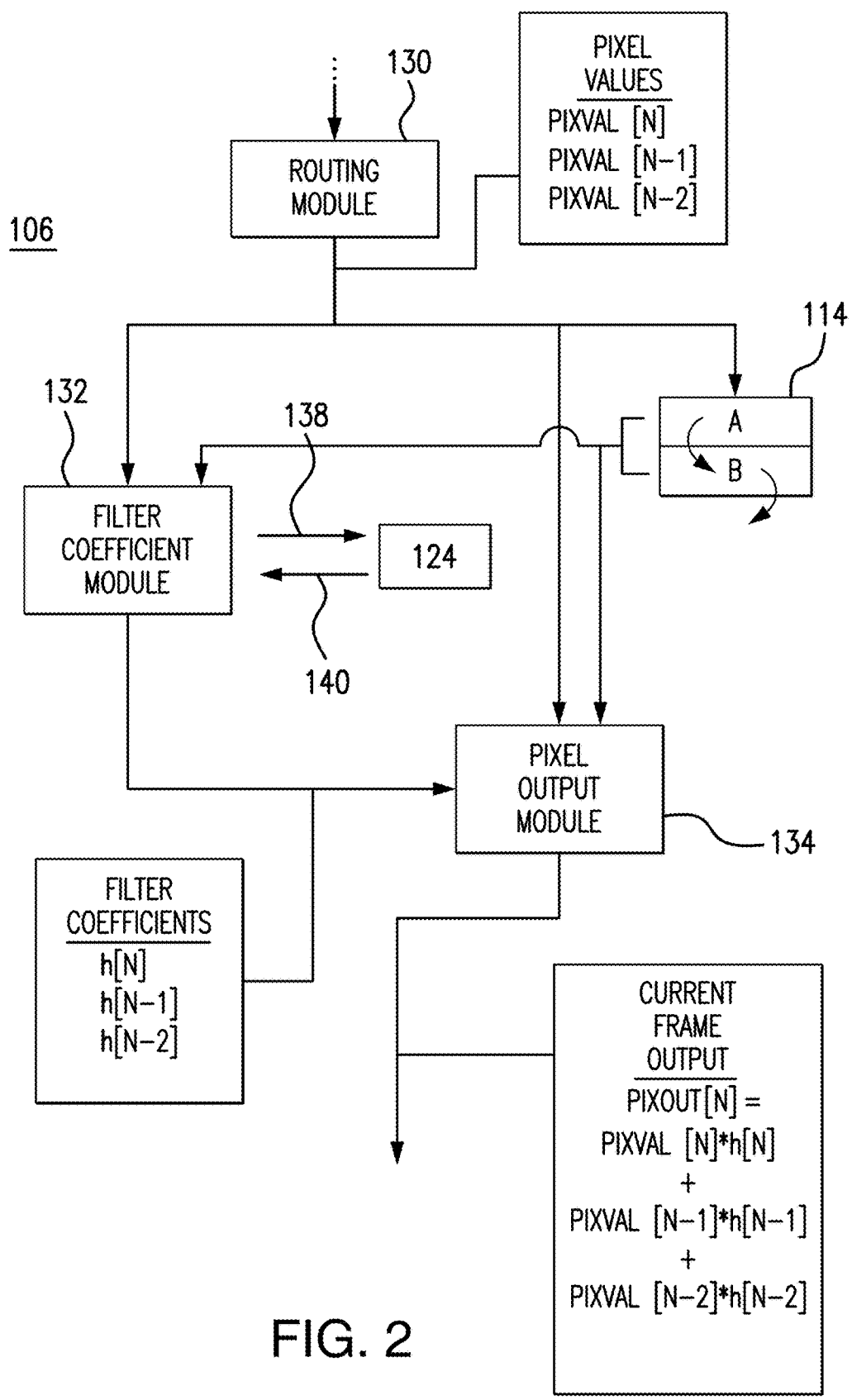
FIG. 2 is a module diagram of an embodiment of the ROIC of FIG. 1, showing a pixel output module adjusting current frame output of the pixel for image lag using with filter coefficients for the current frame value and one or more prior frame pixel values.

With reference to FIG. 2, ROIC 106 is shown in a functional module diagram. ROIC 106 includes a routing module 130, a filter coefficient module 132, and a pixel output module 134. Routing module 130 is communicative with sensor 102 (shown in FIG. 1), filter coefficient module 132, pixel output module 134, and buffer 114. Filter coefficient module 132 is communicative with routing module 130, buffer 114, lookup table 124, and pixel output module 134. Pixel output module 134 is communicative with routing module 130, filter coefficient module 132, and buffer 114. Input buffer 114 is communicative with routing module 130, filter coefficient module 132, and pixel output module 134. Lookup table 124 is accessible by filter coefficient module 132 to provide filter coefficient thereto upon receipt of an address prompt from filter coefficient module 132. In the illustrated exemplary embodiment ROIC 106 is shown adjusting a current frame pixel value, pixval [N] based on the two prior frame pixel values, i.e., a first prior frame pixel value [N−1] and the second prior frame pixel value [N−2], to generate an adjusted current frame pixel output pixout [N].

Routing module 130 is arranged to initiate real time pixel value correction upon receipt of a pixel value for a current frame, i.e. current frame pixel value (pixval [N]). Upon receipt of the pixval [N], routing module 130 communicates pixval [N] to filter coefficient module 132 and pixel output module 134. It is contemplated that routing module 130 provide frame pixel values successively to filter coefficient module 132 and pixel output module 134 for adjustment, e.g., correction, of image lag that may be present in each frame pixel value.

Current frame pixel values are obtained sequentially from a sensor 102 during a read period and indicate illumination received by imaging pixel 104 during the integration period preceding receipt of a given current frame pixel value. For example, upon receipt of current frame pixel value pixval [N], routing module 130 provides current frame pixel value pixval [N] to buffer 114, pixel output module, and filter coefficient module 132.

Buffer 114 can be a circular buffer which receives, re-identifies, and overwrites pixel values from one or more prior integration periods on a first-in-first-out (FIFO) basis. For example, upon receipt of the current frame pixel value pixval [N] from routing module 130, buffer 114 records current frame pixel value pixval [N] in buffer 114 as the last-in value, re-identifies the prior current frame pixel value as the first prior frame pixel value pixval [N−1], and clears the oldest pixel value recorded on buffer 114. As will be appreciated by those of skill in the art in view of the present disclosure, buffer 114 can include two or more pixel value storage locations, e.g., a first prior frame pixel value buffer location A and a second prior frame pixel value buffer location B. First prior frame pixel value buffer location A can retain the first prior frame pixel value pixval [N−1] and second prior frame pixel value buffer location B can retain a second prior frame pixel value pixval [N−2].

Receipt of current frame pixel value pixval [N] at buffer 114 causes buffer 114 to issue a first prior pixel value pixval [N−1] and second prior pixel value pixval [N−2] to filter coefficient module 132 from buffer locations A and B. Buffer 114 then overwrites the pixel value retained in location A with the current pixel value pixval [N] and overwrites the pixel value retained in location B with first prior pixel value pixval [N−1]. This causes the current frame pixval [N] to be identified as the first prior frame pixel value pixval [N−1] and the first prior pixel value resident in buffer 114 at the time current frame pixel value pixval [N] was received to be re-identified as second prior pixel value pixval [N−2].

Receipt of current frame pixel value pixval [N], first prior frame pixel value pixval [N−1], and second prior frame pixel value pixval [N−2] at filter coefficient module 132 causes filter coefficient nodule 132 to generates a temporal filter 140 for current frame pixel value pixval [N]. Temporal filter 140 is generated by forming a lookup table address using the pixel values received by filter coefficient module 132. For example, filter coefficient module 132 can concatenate current frame pixel value pixval [N], first prior frame pixel value pixval [N−1], and second prior frame pixel value pixval [N−2] as a lookup table address 138, provide the address to lookup table 124, and receive from lookup table 124 filter coefficients, which form temporal filter 140, for each of the pixel values. In the illustrated exemplary embodiment filter coefficients include a current frame pixel value filter coefficient h[N], a first prior frame pixel value filter coefficient h[N−1], and a second prior frame pixel value filter coefficient h[N−2], which filter coefficient module 132 provides to pixel output module 134.

Pixel output module 134 applies the filter coefficients in temporal filter 140 to current frame pixel value pixval [N], first prior frame pixel value pixval [N−1], and second prior frame pixval [N−2] to form current frame pixel output pixout [N]. Current frame pixel output pixout [N] is the sum of the products of current frame pixel value pixout [N] and current frame pixel value filter coefficient h[N], first prior frame pixel value pixout [N−1] and first frame prior pixel value filter coefficient h[N−1], and second prior pixel value pixout [N−2] and second prior frame pixel value filter coefficient h[N−2]. This makes current frame pixel output pixout [N] more closely indicate incident illumination 12 (shown in FIG. 1) received by imaging pixel 104 during the integration period during which current frame pixel value pixval [N] was received. Although described herein as correcting lag based on two prior frame pixel values, it is to be understood that lag corrections can be made based on a single prior frame pixel value or more than two prior frame pixel values, as suitable for an intended application.

As will be appreciated by those of skill in the art in view of the present disclosure, the amount of correction necessary for a current frame pixel value can differ based on the exposure condition changes between successive frames. As will also be appreciated by those of skill in the art in view of the present disclosure, additional corrections require additional processing resources. Accordingly, pixel output 142 can include a lookback period of more two or more integration periods. For example, temporal filter 140 can include one or more second prior frame pixel value filter coefficient, e.g., second prior frame filter coefficient h[N−2], which temporal filer multiples with the second prior frame pixel value pixval [N−2] and adds to pixel output 142. This makes pixel output 142 more closely represent illumination incident upon the imaging pixel in situations where there were step function changes in the amount of incident illumination in more than one prior integration period which failed to clear during the intervening readout periods.

Figure 3:
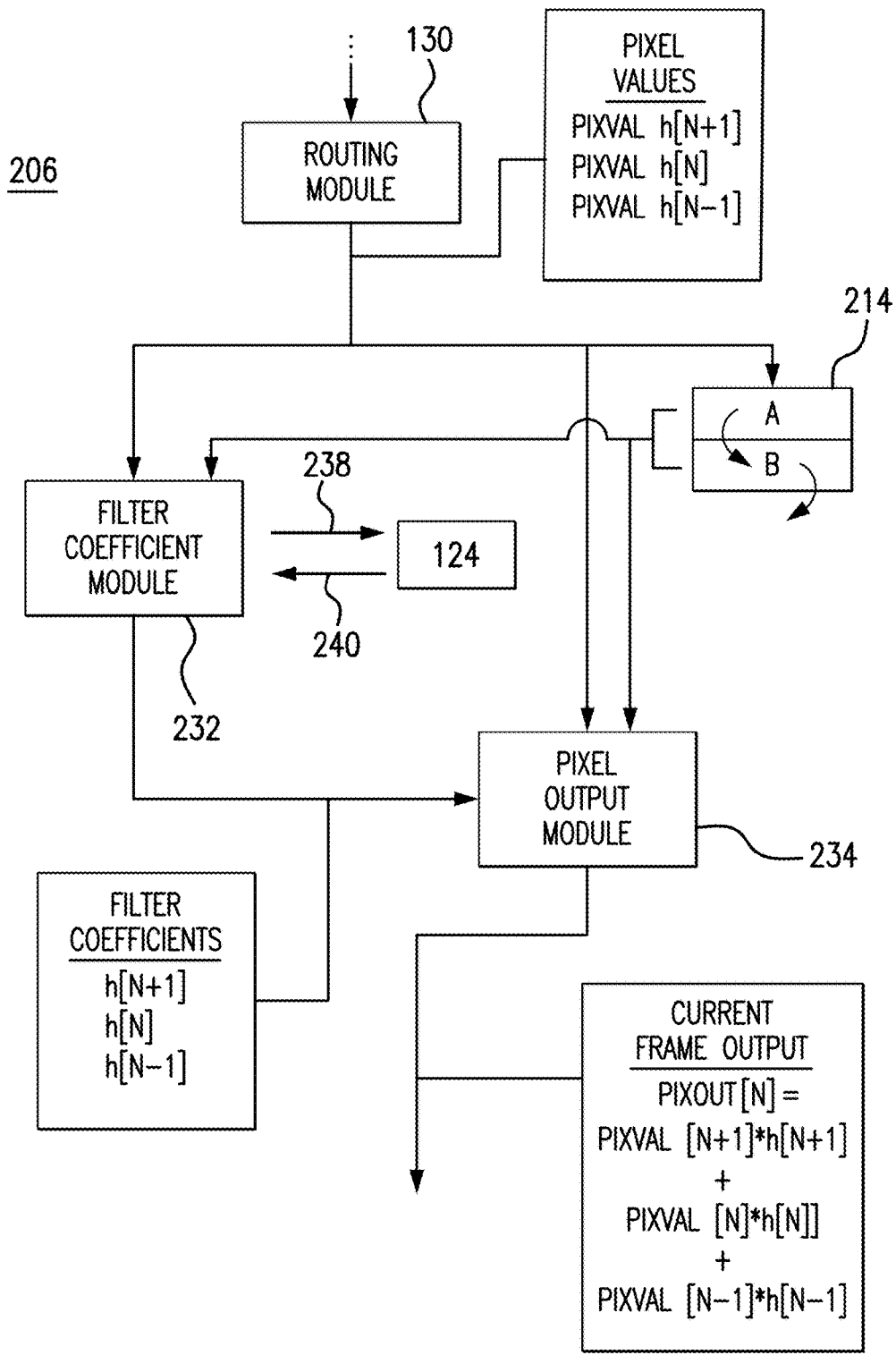
FIG. 3 is a module diagram of another embodiment of the ROIC of FIG. 1, showing a pixel output module adjusting current frame output of the pixel for image lag using with filter coefficients for the current frame value and a subsequent frame value for the pixel.

With reference to FIG. 3, a second embodiment of a ROIC 206 is shown. ROIC 206 is similar to ROIC 106 (shown in FIG. 2) and additionally includes a buffer 214, a filter coefficient module 232, and a pixel output module 234 arranged to adjust current pixel output pixout [N] using a temporal buffer 240. Temporal filter 240 includes current pixel value filter coefficients h[N], one or more prior frame pixel value filter coefficients h[N−1], and one or more subsequent frame pixel value filter coefficients h[N+1]. Pixel output module 234 generates current frame pixel output pixout [N] by summing the products of current pixel value pixval [N] and current frame pixel value filter coefficient h[N], prior frame pixel value pixout [N−1] and first prior frame pixel value filter coefficient h[N−1], and subsequent frame pixel output value pixout [N+1] and subsequent frame pixel value filter coefficient h[N+1].

Figure 4:
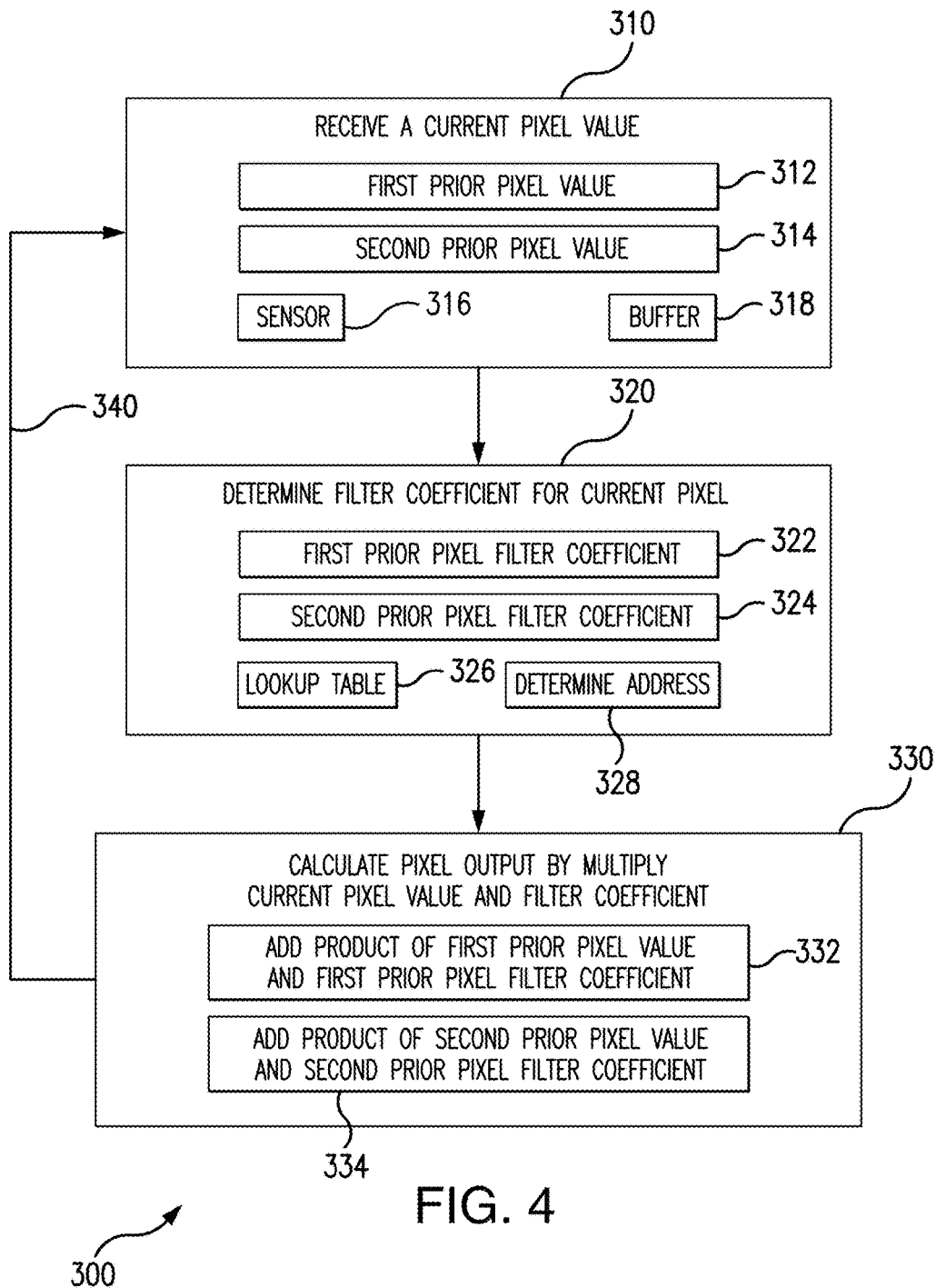
FIG. 4 is a module diagram of a method of correcting imaging lag using ROIC circuitry, showing steps of the method.

With reference to FIG. 4, a method 300 of correcting lag in an imaging pixel, e.g., imaging pixel 104 (shown in FIG. 1), is shown. Method 300 includes receiving a current frame pixel value, e.g., pixval [N] (shown in FIG. 2), as shown in box 310. The current frame pixel value can be received at a ROIC from a sensor, as shown with box 316. The current frame pixel value may be placed in a buffer 114 for processing at a later time. After one frame of latency, a subsequent pixel value, e.g., pixval [N+1], will be available and may be used in the correction processing of the current frame pixel. It is contemplated that a temporal filter include filter coefficients associated with the current frame pixel value and the at least one subsequent pixel value, e.g., temporal filter 140 (shown in FIG. 2) or temporal filter 240 (shown in FIG. 3).

A current filter coefficient is determined for the current frame pixel value, e.g., current filter coefficient h[N] (shown in FIG. 2), based on the current frame pixel value and the subsequent pixel value, as shown in box 320. A subsequent frame filter coefficient is determined for the subsequent pixel value, e.g., filter coefficient h[N+1] (shown in FIG. 3), based on the current frame pixel value and the subsequent pixel value, as shown in box 322. The current filter coefficient can be obtained from a lookup table, e.g., lookup table 124 (shown in FIG. 1), as shown with box 326. Obtaining the current filter coefficient can include determining an address in the lookup table for the current filter coefficient based on the current frame pixel value and the subsequent pixel value, as shown in box 328. An output value of the pixel is determined by the ROTC, e.g., pixout (shown in FIG. 2), multiplying the current frame pixel value by the current filter coefficient and summing with the product of the subsequent pixel value and the subsequent pixel filter coefficient, as shown by box 330. As will be appreciated by those of skill in the art in view of the present disclosure, the pixel output more closely indicates the actual intensity incident on the imaging pixel during the prior integration period by reducing lag in the pixel value.

Method 300 also includes retrieving a first prior frame pixel value, e.g., first prior frame pixel value pixval [N−1], as shown with box 312. A corresponding first prior filter coefficient can be obtained from the lookup table, e.g., first prior frame pixel value filter coefficient h[N−1], as shown with box 312. The first prior frame filter coefficient can be obtained from the lookup table by determining an address for the first prior frame filter coefficient using the first prior frame filter coefficient. A product of the first prior frame pixel value and the first prior frame pixel value filter coefficient can be added to the pixel output, thereby making the pixel output further more closely indicates the actual intensity incident on the imaging pixel during the prior integration period by reducing lag in the pixel value.

Method 300 can include retrieving at least one second prior frame pixel value, e.g., second prior frame pixel value pixval [N−2], as shown with box 314. A corresponding second prior frame filter coefficient can be obtained from the lookup table, e.g., second prior frame pixel value filter coefficient h[N−2], as shown with box 324. The second prior frame filter coefficient can be obtained from the lookup table by determining an address for the second prior frame filter coefficient using the second prior frame filter coefficient. A product of the second prior frame pixel value and the second prior frame pixel value filter coefficient can be added to the pixel output, thereby making the pixel output still further more closely indicates the actual intensity incident on the imaging pixel during the prior integration period by reducing lag in the pixel value. As shown by arrow 340, method 300 can be in real time to correct each pixel value received by the ROIC, thereby systematically correcting image data received from sensor 102 (shown in FIG. 1) for lag.

It is contemplated that the first prior frame pixel value can be obtained from the buffer upon receipt of the current frame pixel value. The current frame pixel value can be provided to the buffer, and the buffer can replace the last received pixel value with the current frame pixel value. The last received pixel value can be re-identified as a second prior frame pixel value, e.g., second prior frame pixel value pixval [N−2]. A last-received pixel value of the buffer can be removed from the buffer.

The methods and systems of the present disclosure, as described above and shown in the drawings, provide for imaging devices with superior properties including ROIC with on-chip circuitry for correction of detector lag or persistence. While the apparatus and methods of the subject disclosure have been shown and described with reference to preferred embodiments, those skilled in the art will readily appreciate that change and/or modifications may be made thereto without departing from the scope of the subject disclosure.

What is claimed is:

1. A method of correcting image lag in an imaging pixel, comprising:
   converting electromagnetic radiation in an infrared waveband into a first pixel value;
   receiving the first pixel value from a current frame;
   converting electromagnetic radiation in the infrared waveband into at least one second pixel value;
   receiving the at least one second pixel value from at least one of a prior frame and a subsequent frame;
   determining a first filter coefficient for the first pixel value;
   determining a second filter coefficient for the at least one second pixel value;
   calculating a pixel output by adding (a) a product of the first pixel value and the first filter coefficient to (b) a product of the at least one second pixel value and the corresponding second filter coefficient to compensate for image lag in the first pixel value; and
   displaying an image on a display device using the calculated pixel output.

2. The method as recited in claim 1, wherein receiving the first pixel value from the current frame comprises receiving the first pixel value from a sensor and receiving a second pixel value of the at least one second pixel value from the prior frame includes receiving the second pixel value from a buffer.

3. The method as recited in claim 1, wherein determining the second filter coefficients for the at least one second pixel value includes using the at least one second frame pixel value.

4. The method as recited in claim 1, wherein receiving the at least one second pixel value comprises receiving a first prior frame pixel value from a prior frame, and at least one second prior frame pixel value from a different prior frame.

5. The method as recited in claim 4, further comprising:
determining a first prior frame filter coefficient using the first prior frame pixel value; and
determining a second prior frame filter coefficient using the second prior frame pixel value, wherein calculating the pixel output further comprises adding a product of the first prior frame pixel value and the first prior frame filter coefficient and a product of the second prior frame pixel value and the second prior frame filter coefficient to the product of the first pixel value and the first filter coefficient.

6. The method as recited in claim 1, further comprising buffering the first pixel value in a buffer.

7. The method as recited in claim 6, wherein buffering the first pixel value includes replacing a second pixel value of the at least one second pixel value with the first pixel value.

8. The method as recited in claim 6, wherein buffering the first pixel value includes removing a pixel value from a prior frame stored in the buffer.

9. The method as recited in claim 1, wherein determining the first or second filter coefficients includes looking up the corresponding first or second filter coefficients in a lookup table stored in a memory.

10. The method as recited in claim 9, wherein a lookup address for looking up the corresponding first or second filter coefficients includes the first pixel value and the a second pixel value of the at least one second pixel value from the prior frame.

11. The method as recited in claim 9, wherein a lookup address for looking up the corresponding first or second filter coefficients includes the first pixel value and a second pixel value of the at least one second pixel value from the subsequent frame.

12. The method as recited in claim 1, wherein receiving the first pixel value includes receiving the first pixel value at a filter coefficient module and a pixel output module.

13. The method as recited in claim 1, further comprising:
buffering the first pixel value and the at least one second pixel value on a readout interface circuit (ROIC);
determining at least one of the first and second filter coefficients for the respective first pixel value and the at least one second pixel value from a lookup table stored on the ROIC; and
calculating the pixel output is performed using a processor disposed on the ROIC.

14. The method as recited in claim 13, wherein the buffered at least one second pixel value corresponds to at least one of a prior frame value received from a prior frame or a subsequent frame value received from a subsequent frame.

15. An imaging apparatus, comprising:
a sensor comprising an array of imaging pixels;
readout interface circuit (ROIC) disposed in communication with the sensor and having a processor and a buffer; and
a memory having instructions recorded thereon that, when read by the processor, cause the processor to:
convert electromagnetic radiation in an infrared waveband into a first pixel value;
receive the first pixel value from an imaging pixel from a current frame;
convert electromagnetic radiation in the infrared waveband into at least one second pixel value;
receive the at least one second pixel value from the imaging pixel from at least one of a prior frame and a subsequent frame;
determine a first filter coefficient for the first pixel value;
determine a second filter coefficient for the corresponding at least one second pixel value; and
calculate a pixel output of the imaging pixel for the current frame by adding (a) a product of the first pixel value and the first filter coefficient to (b) a product of the at least one second pixel value and the corresponding second filter coefficient to compensate for image lag in the first pixel value; and
display an image on a display device using the calculated pixel output.

16. The apparatus as recited in claim 15, wherein the buffer is co-located with the ROIC.

17. The apparatus as recited in claim 15, wherein the memory is co-located with the ROIC.

18. The apparatus as recited in claim 15, wherein the memory is remote from the ROTC.

19. The apparatus as recited in claim 15, wherein the memory has a lookup table recorded on it with global pixel value filter coefficients addressed by pixel values corresponding to at least one prior frame, the global pixel value filter coefficients be nonspecific to a particular imaging pixel.

20. The apparatus as recited in claim 15, wherein the memory has a lookup table recorded on it with global pixel value weights addressed by the first pixel value and the at least one second pixel value, the global pixel value weights being nonspecific to a particular imaging pixel.

* * * * *